US012745749B2

(12) United States Patent
Marks et al.

(10) Patent No.: US 12,745,749 B2
(45) Date of Patent: Sep. 29, 2026

(54) SMALL REPTILE CAGE AND METHOD OF ASSEMBLY

(71) Applicant: Ecotech Marine, LLC, Allentown, PA (US)

(72) Inventors: Timothy Marks, Northampton, PA (US); Patrick Clasen, Allentown, PA (US); Christian Clough, Bethlehem, PA (US); Justin Lawyer, Bethlehem, PA (US)

(73) Assignee: EcoTech, LLC, Bethlehem, PA (US)

( * ) Notice: Subject to any disclaimer, the term of this patent is extended or adjusted under 35 U.S.C. 154(b) by 602 days.

(21) Appl. No.: 16/863,574

(22) Filed: Apr. 30, 2020

(65) Prior Publication Data

US 2020/0344976 A1 Nov. 5, 2020

Related U.S. Application Data

(60) Provisional application No. 62/840,760, filed on Apr. 30, 2019.

(51) Int. Cl.

| | |
|---|---|
| ***A01K 1/03*** | (2006.01) |
| ***A01K 1/01*** | (2006.01) |
| ***A01K 63/00*** | (2017.01) |

(52) U.S. Cl.

CPC .................. *A01K 1/03* (2013.01); *A01K 1/01* (2013.01); *A01K 63/003* (2013.01)

(58) Field of Classification Search

CPC ........... A01K 1/03; A01K 63/003; A01K 1/01

(Continued)

(56) References Cited

U.S. PATENT DOCUMENTS

| | | | | |
|---|---|---|---|---|
| 2,172,956 A * | 9/1939 | Derman | E06B 9/115 312/297 |
| 2,194,722 A * | 3/1940 | Roberts | A47B 81/00 217/2 |

(Continued)

FOREIGN PATENT DOCUMENTS

| | | | |
|---|---|---|---|
| EP | 1166626 A1 | 1/2002 | |
| WO | WO-9206590 A1 * | 4/1992 | A01K 1/0245 |

OTHER PUBLICATIONS

EPO—International Search Report in related PCT Application No. PCT/US20/30791—Jun. 29, 2020.

*Primary Examiner* — Kimberly S Berona
*Assistant Examiner* — K. Dennis
(74) *Attorney, Agent, or Firm* — CALDERON SAFRAN & WRIGHT P.C.

(57) ABSTRACT

This invention relates to an animal cage, particularly for small animals such as cats, rabbits, small dogs, hamsters, reptiles, amphibians, etc., which is lightweight and collapsible to flat components in order to allow shipment and ease of assembly. The cage is a six-sided rectangular box with at least a top side and/or a front side being mostly mesh to provide ventilation. At least the back, left, and right sides of the cage are made from a single flat sheet of material, preferably corrugated plastic, which is die cut, and contains pre-formed fold lines. Each of the tops and front sides includes a perimeter frame with mesh or solid material inside the frame. The frames are preferably made of linear profile sections connected that the corners by molded joints. The font side includes at least one door for accessing the interior of the rectangular box.

18 Claims, 24 Drawing Sheets

(58) Field of Classification Search
USPC .................................. 119/474, 472, 479, 481
See application file for complete search history.

(56) References Cited

U.S. PATENT DOCUMENTS

| | | | | |
|---|---|---|---|---|
| 2,839,348 | A * | 6/1958 | Giannini | A63H 3/52 446/482 |
| 3,409,976 | A * | 11/1968 | Kesling | F25D 23/066 220/592.02 |
| 5,794,567 | A * | 8/1998 | Itzhak | A01K 63/003 119/458 |
| 5,839,392 | A * | 11/1998 | Pemberton | A01K 1/0245 119/498 |
| 6,763,784 | B1 * | 7/2004 | Liu | A01K 31/08 119/452 |
| 6,848,758 | B1 * | 2/2005 | Yeh | F16B 12/24 312/258 |
| 7,044,081 | B1 * | 5/2006 | Bridges | A01K 63/003 119/472 |
| 7,252,200 | B1 * | 8/2007 | Hester | A47F 5/116 211/187 |
| D581,602 | S * | 11/2008 | Jakubowski | D30/114 |
| 9,521,826 | B2 * | 12/2016 | Rybka | A01K 15/02 |
| D798,507 | S * | 9/2017 | Haakman | D30/119 |
| D842,949 | S * | 3/2019 | Shaughnessy | D21/705 |
| D930,265 | S * | 9/2021 | Tuthill | D30/118 |
| 2001/0054394 | A1 * | 12/2001 | Marchioro | A01K 1/032 119/452 |
| 2002/0100429 | A1 * | 8/2002 | Wade | A01K 63/003 119/452 |
| 2016/0227731 | A1 * | 8/2016 | Cheng | E05B 63/14 |

* cited by examiner

SMALL REPTILE CAGE AND METHOD OF ASSEMBLY

This application claims the benefit of priority of U.S. Provisional Patent Application No. 62/840,760, filed Apr. 30, 2019, which is incorporated herein by reference.

FIELD OF THE INVENTION

This invention relates to an animal cage, particularly for small reptiles such as snakes, lizards, turtles, amphibians, etc. In particular, the cage is lightweight and collapsible to flat components in order to allow shipment in a flat carton and ease of assembly at the point of use.

BACKGROUND OF THE INVENTION

Many owners, trainers, breeders and veterinarians recommend an animal cage as a convenient and humane tool for training and to provide a safe environment for housebreaking, travel, and general control of small animals, such as cats, rabbits, small dogs, hamsters, reptiles, amphibians, etc. Existing cages on the market are of primarily of two designs. The first design includes a six-sided cage made of screen panels made of metal, which assemble individually using aluminum profiles, plastic corner joints, and window screens. The individual window screen panels are then assembled together, holes are pre-drilled, and screws are threaded through the holes to construct a cage assembly. Front doors are fastened to the sides using conventional hinges. This first design is difficult to assemble and fragile, heavy and bulky to ship, and allows the escape of water and moisture from the cage after assembly, making it challenging to maintain a stable environment for the inhabitants.

The second design is a glass cage of either five solid sides (top side open) or six sides with the top being made of screen material and the front being a hinged glass door. This second design is heavy and fragile to ship, and takes up enormous space within the distribution chain. The design is usually limited to only small sizes due to its weight and space requirement.

Therefore, there remains a need for a caging system that resolves issues with the above animal cage designs.

SUMMARY OF THE INVENTION

A first aspect of the present invention relates to an animal cage, particularly for small animals such as cats, rabbits, small dogs, hamsters, reptiles, amphibians, etc. In particular, the animal cage is lightweight and collapsible to flat components in order to allow easy shipment in a carton and assembly at the point of use. The cage is a six-sided rectangular box with at least a top side and/or a front side being mesh to provide ventilation. The bottom, back, left, and right sides of the cage are made from a single flat sheet of material, preferably corrugated plastic, which is die cut, and contains pre-formed fold lines. Alternatively, only the back, left, and right sides of the cage are made from a single flat sheet of material, preferably corrugated plastic, which is die cut, and contains pre-formed fold lines. The top side and front sides include perimeter frames with mesh or solid material inside the frame. The front side includes a top and bottom portion and provides one or more doors for access to the interior of the cage system. The top side preferably includes mesh inside the frame for ventilation. Because the animal cage is constructed mostly of plastic material, it is easy to cut holes into the plastic material for ventilation, drainage, wires, etc.

A second aspect of the present invention relates to a double or multiple cage system. The double cage system is similar to the cage of the first aspect. However, due to the larger size of the cage, additional structural support is provided to maintain the integrity of the assembled structure.

A third aspect of the present invention relates to methods for making the different aspects of the present invention.

Other aspects of the invention, including apparatus, devices, kits, processes, and the like which constitute part of the invention, will become more apparent upon reading the following detailed description of the exemplary embodiments.

BRIEF DESCRIPTION OF THE DRAWINGS

The foregoing background, as well as the following detailed description, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings

DETAILED DESCRIPTION OF THE PREFERRED EMBODIMENT(S)

Figure 1:
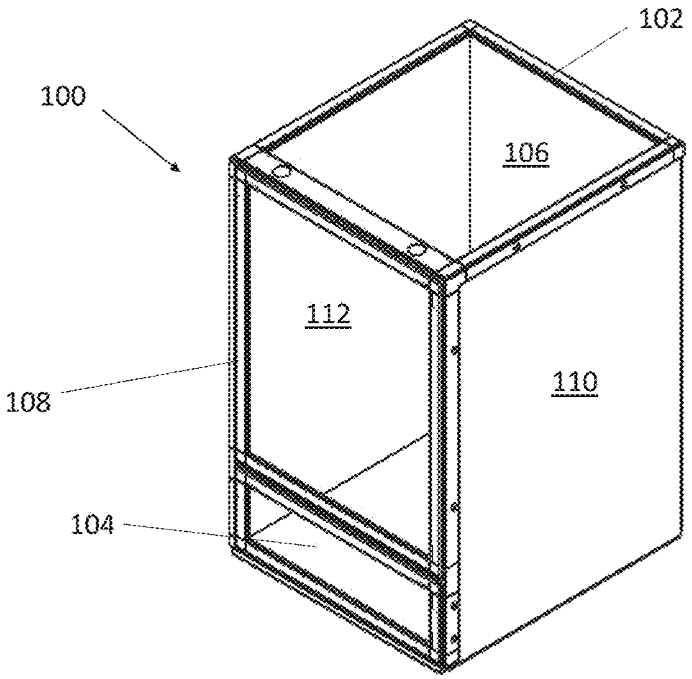
FIG. 1 is a perspective view of the assembled animal cage system.

The exemplary embodiment of the present invention will now be described with the reference to accompanying drawings. The following description of the preferred embodiment is merely exemplary in nature and is in no way intended to limit the invention, its application, or uses.

For purposes of the following description, certain terminology is used in the following description for convenience only and is not limiting. The characterizations of various components and orientations described herein as being "front," "back" "vertical", "horizontal", "upright", "right", 'left", "side", "top", "bottom", or the like designate directions in the drawings to which reference is made and are relative characterizations only based upon the particular position or orientation of a given component as illustrated. These terms shall not be regarded as limiting the invention. The words "downward" and "upward" refer to position in a vertical direction relative to a geometric center of the apparatus of the present invention and designated parts thereof. The terminology includes the words above specifically mentioned, derivatives thereof and words of similar import.

The present invention, as best shown in FIG. 1, is an animal cage system that is constructed of corrugated plastic sheet and extruded aluminum profiles of thin walls. The cage system may be shipped flat in a carton ("knock-down"), is strong and robust, retains a constant environment, and may be manufactured in large and small sizes while taking up very little space within the supply chain. Additionally, due to economically priced materials, the comparative cost is favorable relative to existing solutions. The disclosed cage system is preferably used with small reptiles and the non-rodent mammals because many small mammals are rodents, who have a tendency to chew through materials such as used to manufacture the cage system.

Referring to FIG. 1, the animal cage system 100, when assembled, contains a plurality of sides hingedly coupled together. Preferably, the cage system 100 is a rectangular box containing six sides: a top side 102, a bottom side 104, a back side 106, a front side 108, a right side 110, and a left side 112. The back side 106, right side 110, and left side 112 are preferably solid sides, preferably made from corrugated plastic sheet material, preferably about 4 mm in thickness. An exemplary corrugated material is made from polypropylene, such as available from Coroplast®. Coroplast comprises three layers of thin, polypropylene plastic substrate having a zig-zagged layer of plastic sandwiched between two smooth layers of plastic sheeting.

The bottom side 104 may be solid or contain an opening 114 at its center (see FIGS. 2-3) for drainage. The opening 114 preferably occupies an area at least 50% of the total area of the bottom side 104, more preferably at least 60%, most preferably at least 70%.

Figure 5:
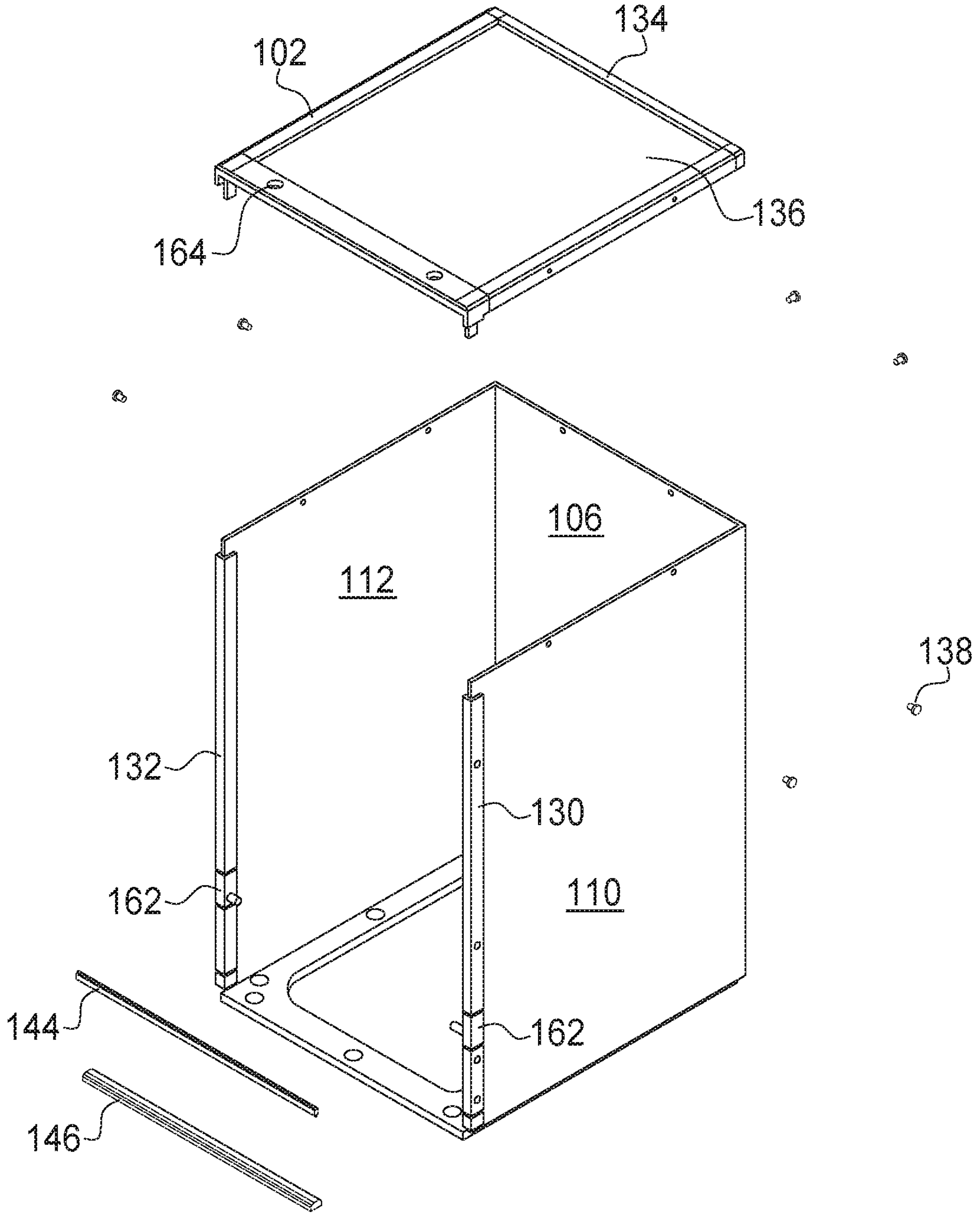
FIG. 5 is an exploded view of the assembled corrugated plastic part, the top side, the divider, and lower profiles.

The top side 102 preferably includes a perimeter frame 134 and a mesh screen or plastic material filling the open area 136 inside the frame 134 (see FIG. 5). The frame 134 of the top side may include one or more openings 164 (see FIGS. 5 and 12) formed therein for connecting utilities, such as water or electrical wires to the interior of the cage system 100. The openings 164 are preferably covered, with a plug or a press-out material until the openings 164 are needed.

Figure 6:
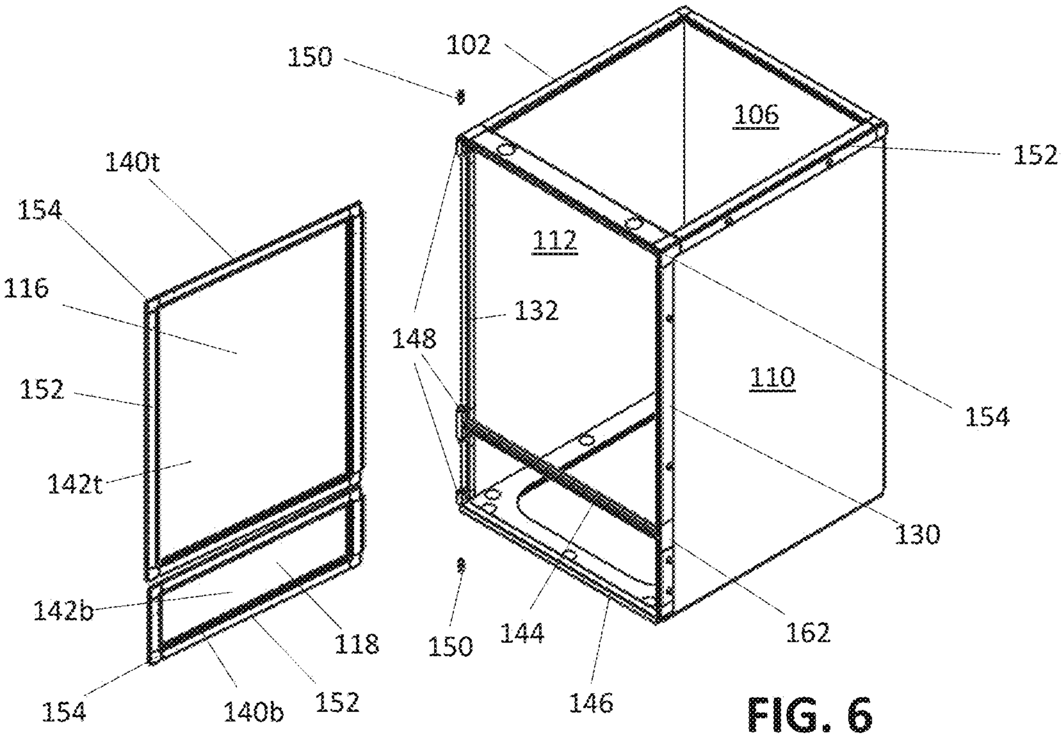
FIG. 6 is an exploded view of the partially assembled cage and the front doors.

The front side 108 preferably contains a top portion 116 and a bottom portion 118 (see FIG. 6). The top portion 116 is typically larger than bottom portion 118 to allow ease of access to the interior of cage system 100. For example, the top portion 116 has an area at least twice that of the bottom portion 118. The top portion 116 includes a perimeter frame 140*t* and either a mesh screen or clear material, such as glass or plastic, filling the open area 142*t* inside the frame 140*t* The bottom portion 118 includes a perimeter frame 140*b* and either a mesh screen or a clear material, such as glass or plastic, filling the open area 142*b* inside the associated the frame 140*b*. Both the top and bottom portions 116 and 118 may contain mesh screens within open area 142*t* and 142*b*; both the top and bottom portions 116 and 118 may contain glass within open area 142*t* and 142*b*; the top portion 116 may contain a mesh screen while the bottom 118 contains glass within open area 142*t* and 142*b*, respectively; or the top portion 116 may contain glass while the bottom 118 contains a mesh screen within open area 142*t* and 142*b* respectively. The mesh screen making up one or more of the sides provides ventilation for the cage system 100. The perimeter frames 140*t*, 140*b*, or 134 are preferably made from linear profile sections 152, preferably extruded aluminum profiles, that may be connected together with corner joints 154, preferably made from injection-molded plastic.

Figure 2:
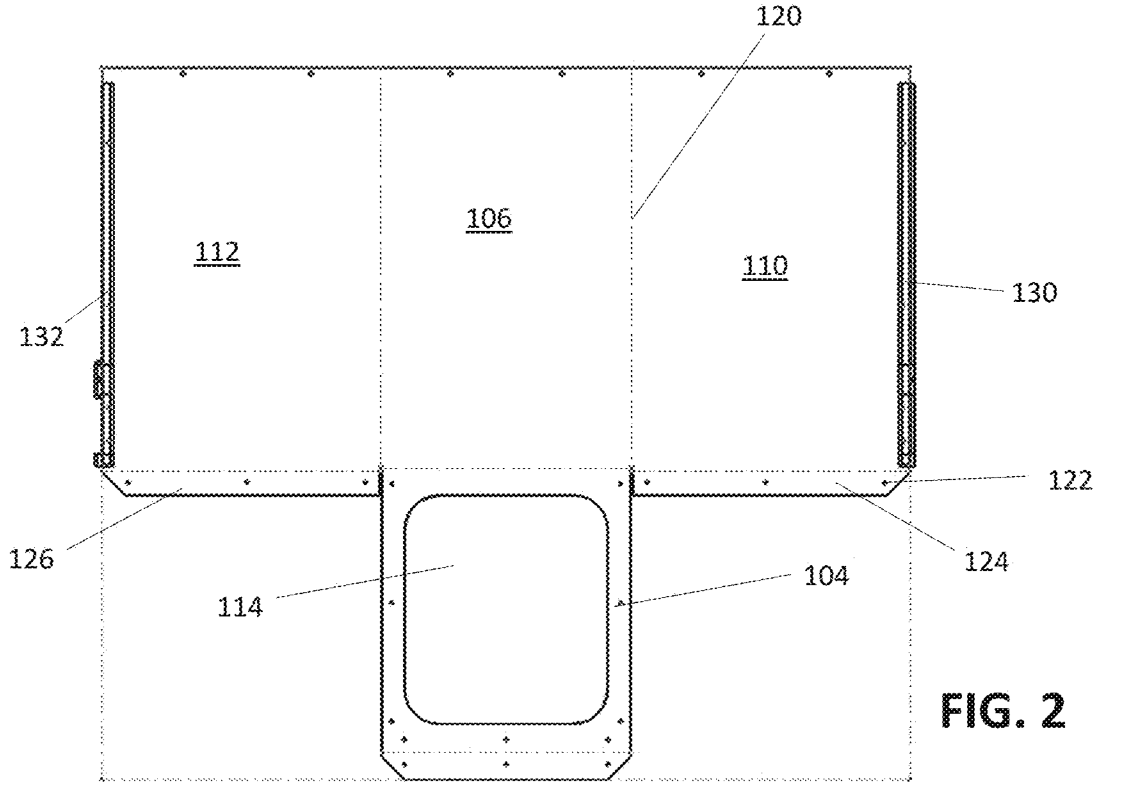
FIG. 2 is a plan view of the corrugated plastic cutout for the cage.
Figure 3:
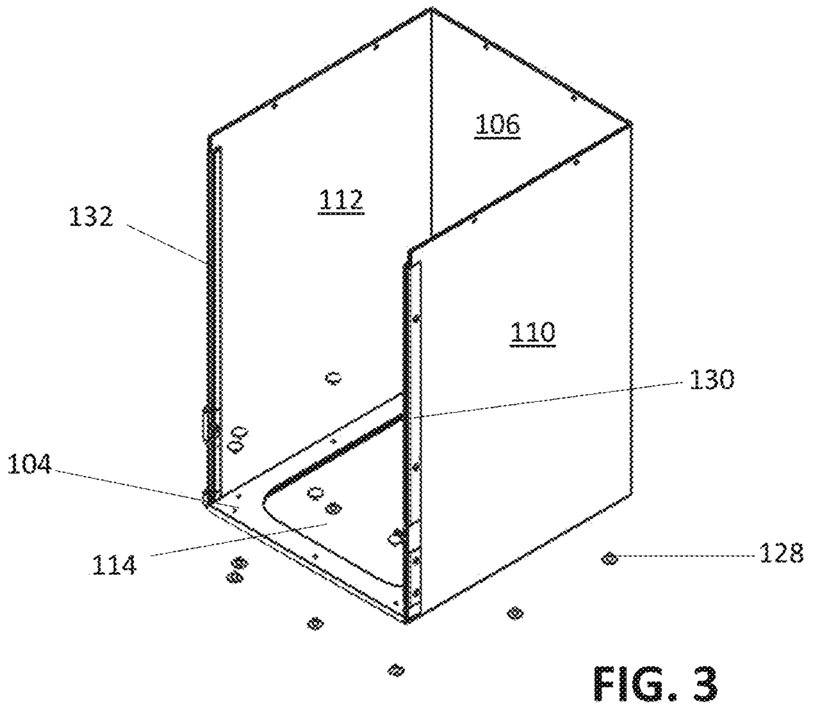
FIG. 3 is a perspective view of the assembled corrugated plastic part.

In a first embodiment, the bottom, back, left, and right sides 104, 106, 110, and 112, respectively, are made from a single flat sheet of material 101, preferably corrugated plastic, which is die cut, and contains pre-formed fold lines 120, as best shown in FIG. 2, forming seams to allow folding of the corrugated sheet 101 into a four sided structure (see FIG. 3). In certain embodiments, holes 122 are formed in the corrugated plastic sheet 101 for connection of the associated sides with mechanical fasteners, such as rivets, screws, nuts/bolts, etc., and/or adhesive. The right and left sides 110 and 112 may include flange portions 124 and 126, respectively, to allow the right and left sides 110 and 112 to be connected to the bottom side 104, such as with mechanical fasteners and/or adhesive. Attached to the left and right sides 110 and 112 are the vertical rail assemblies 130 and 132, respectively, preferably made from extruded aluminum profile sections and/or injection molded plastic parts. The rail assemblies 130 and 132 are used to attach the front side 108 to the cage system 100, as noted below.

Figure 4:
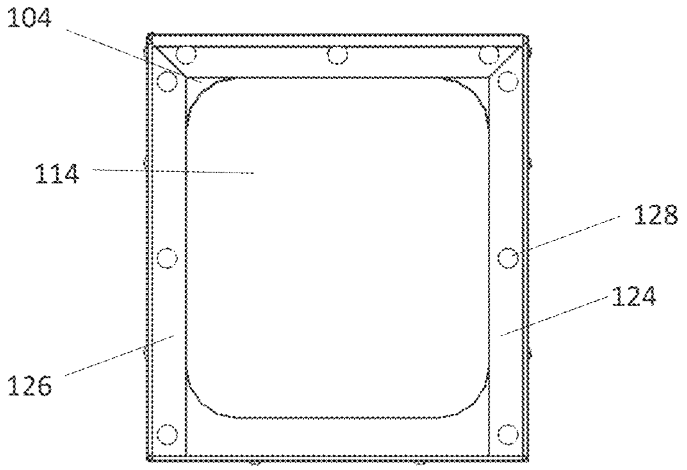
FIG. 4 is a bottom view of the assembled corrugated plastic part.

To assemble the first embodiment of the cage system 100, the flat sheet 101 (as shown in FIG. 2) is folded along fold lines 120 to form the bottom, back, left, and right sides 104, 106, 110, and 112 (see FIG. 3). In certain embodiments, mechanical fasters 128 may be placed through holes 122 prior to folding in order to hold the sides together (see FIGS. 3 and 4) during assembly. Alternatively, the sides 104, 106, 110, and 112 may be folded, the profiles 152 located at the associated fold lines and then the fasteners inserted in sequential fashion; i.e., a profile secured to the fold line 120 between sides 106 and 110, and then a profile secured at the fold line 120 between sides 112 and 106.

The top side 102 may then be attached to the thus assembled structure (see FIG. 5). The frame 134 of the top side 102 is attached to the back, right, and left sides 106, 110, and 112, respectively, with adhesive and/or fasteners 138. Alternatively, an adhesive may be used instead of or in addition to the fasteners 138. A divider profile 144 is attached to the rail assemblies 130 and 132, as best shown in FIG. 6, to divide the front opening into top and bottom sections. The top section accommodates the top portion 116 of the front side 108 and the bottom section accommodates the bottom portion 118 of the front side 108. Preferably, the divider profile 144 is held in place by friction from a press-fit mating part 162 (preferably from by injection molding of plastic) on the rail assemblies 130 and 132, such as provided by a spring loaded male fitting that mates with a female fitting attached to rail assembly 130, and/or by one or more fasteners. A lower profile 146 slides over the lowest hem joint of the folded corrugated plastic assembly and is held in place by friction or by a pre-designed spring force of the lower profile 146 itself. Alternatively, the ends of the lower profile 146 may be attached to the right and left sides 110 and 112, respectively, by mechanical fasteners at the corners formed by the bottom side 104 and the right side 110 and by the bottom side 104 and the left side 112. The lower profile 146 prevents the lowest hem joint from bowing and preserves the structural integrity of the cage system 100.

Figure 12:
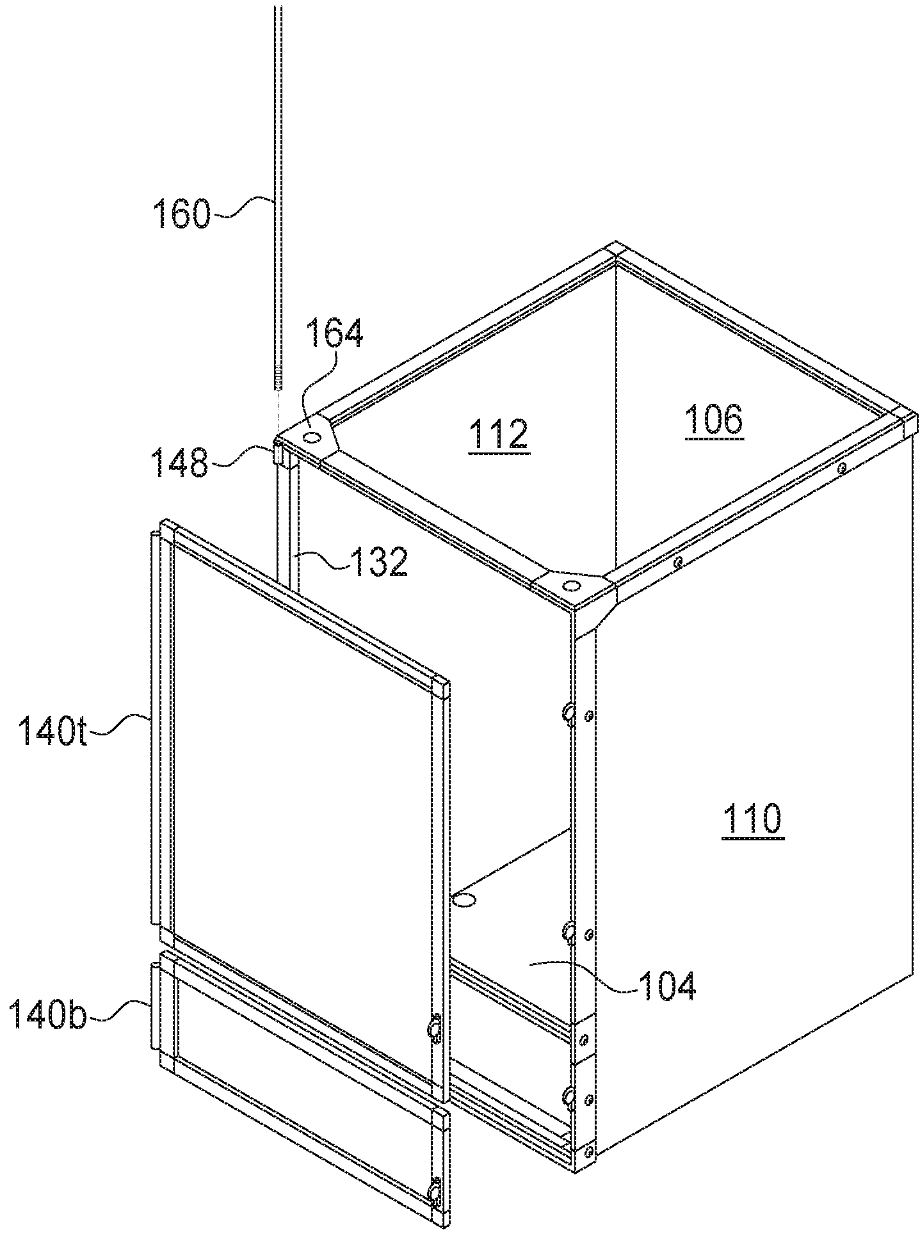
FIG. 12 is an exploded view of the partially assembled second embodiment of the cage and the front doors.

The top and bottom portions 116 and 118 of the front side 108 are then attached to form doors (see FIG. 6) for the cage assembly 100. The top and bottom portions 116 and 118 slide into place over hinge positions 148 located on the rail assembly 132. As best shown in FIG. 12, a single metal hinge pin 160 traverses all three hinge positions 148 to hingedly attach the top and bottom portions to the rail assembly 132. Alternatively, metal hinge pins 150 are threaded down from above and up from the bottom into the top and lower hinge positions, respectively, to secure the of the top and bottom portions 116 and 118. In another alternative, a pintle may extend downwardly from frame 134 to fit within a hinge opening integral with upper frame 140*t*. A pintle may also extend upwardly from the lower profile 146 to fit with a hinge opening formed in lower frame 140*b*. Once assembled, the top and bottom portions 116 and 118 form doors for the cage system 100. The doors may be opened by pivoting the top or bottom portion 116 or 118 about its hinge attachment to the rail assembly 132. Opposing the hinge attachment, the door for portions 116 and 118 may contain a latching mechanism for securing the door in a closed position. Common latching mechanisms are well-known to a skilled person in the art. Although the drawings show the hinge positions 148 located on the rail assembly 132, the hinge positions 148 may be located on the opposing rail assembly 130.

Figure 10:
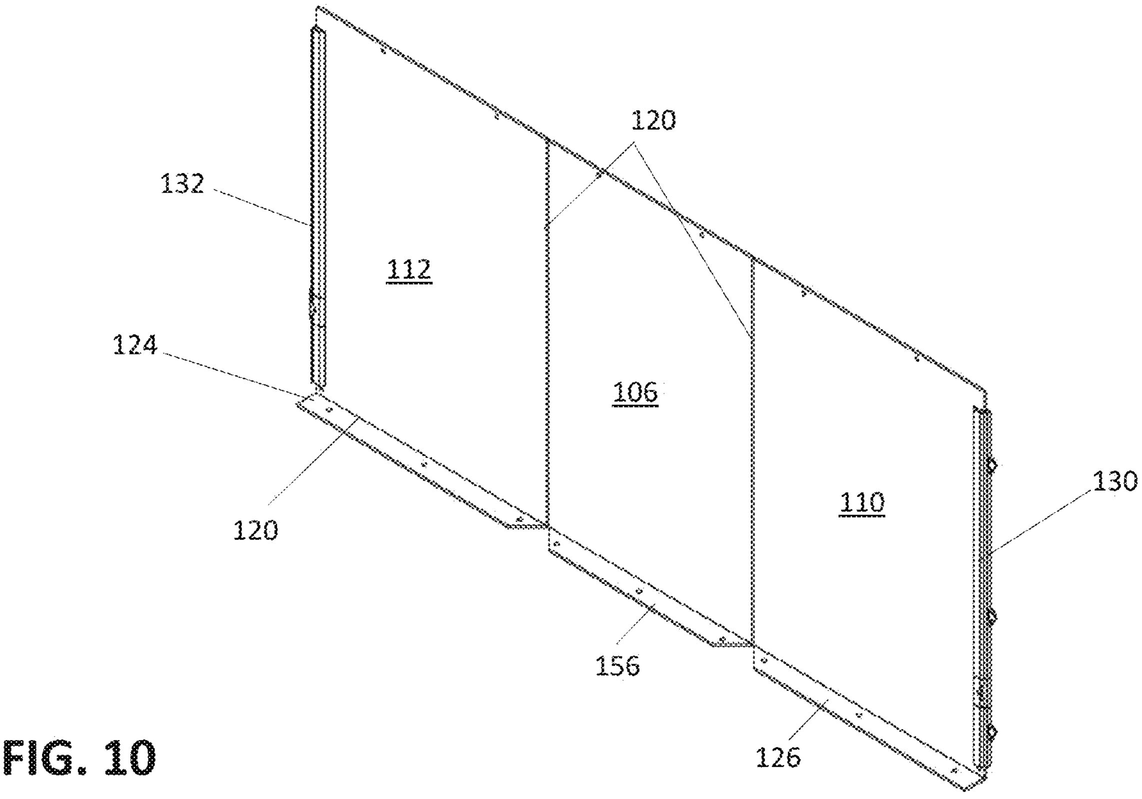
FIG. 10 is a a perspective view of the corrugated plastic cutout for a second embodiment of the cage.

In a second embodiment, as best shown in FIG. 10, the back, left, and right sides 106, 110, and 112, respectively, are made from a single flat sheet of material, preferably corrugated plastic, which is die cut, and contains pre-formed fold lines 120. Because the bottom side 104 is not included in the flat sheet, the back side 106 may also include a flange portion 156 at the bottom for attachment of bottom side 104. As described above, the right and left sides 110 and 112 also include flange portions 124 and 126, respectively, and vertical rail assemblies 130 and 132, respectively.

Figure 11:
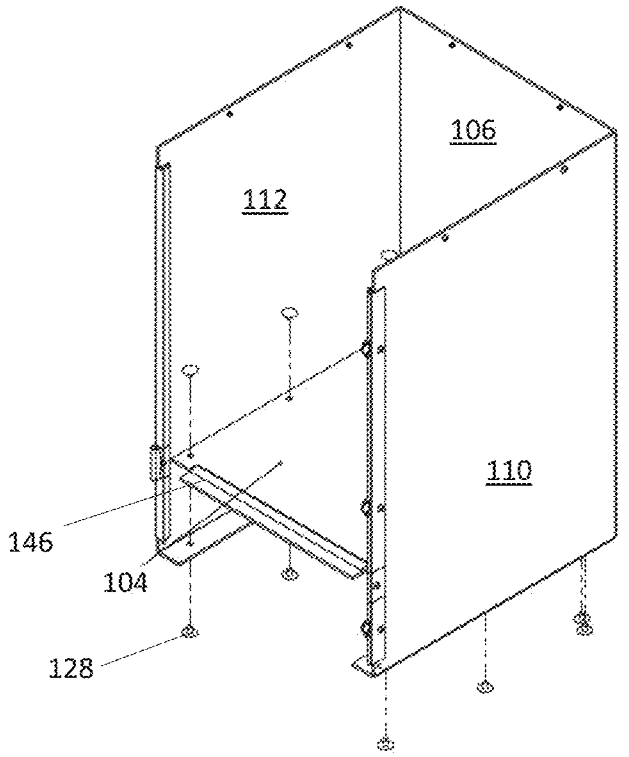
FIG. 11 is a perspective view of the assembled corrugated plastic parts of the second embodiment and the bottom side.
Figure 24:
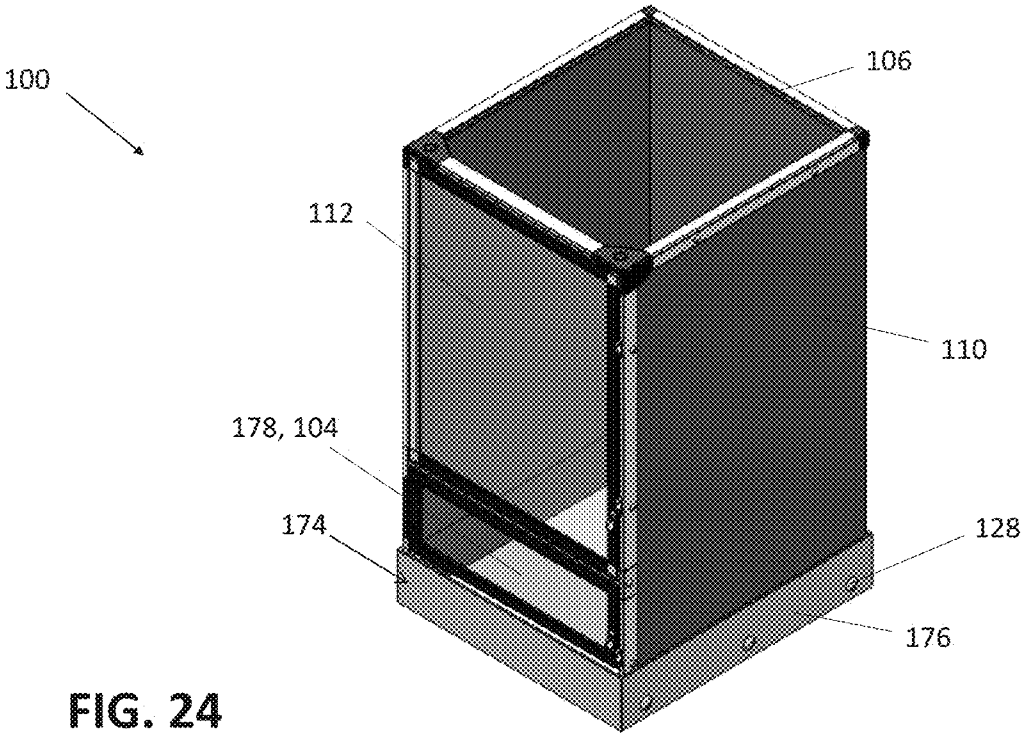
FIG. 24 shows a perspective view of the animal cage with a pan forming the bottom side.

As best shown in FIG. 11, the bottom side 104 is made from a sheet of material, preferably corrugated plastic, and attached to the flange portions 124, 126, and 156 by adhesive and/or mechanical fasteners 128, such as rivets, nuts/bots, screws, clips, or combinations thereof. The bottom side 104 may be solid or contain an opening, as disclosed above for the first embodiment. Alternatively, the bottom side 104 may include a pan 174 which may or may not be attached to the rest of the cage 100 (see FIG. 24). The rest of the cage 100 (without a bottom side 104) may be placed inside the pan 174, so that the bottom 178 of the pan 174 itself forms the bottom side 104. The pan 174 may contain raised walls 176 that can be attached to the right, back, and/or left side(s) 110, 106, 112 with mechanical fasteners 128 and/or adhesive. The pan may be made of an extruded or molded plastic or metallic material or glass material. If a pan 174 is used to form the bottom side 104, a lower profile 146 is not needed.

The top and front sides 102 and 108 of the second embodiment are substantially similar to the top and front sides 102 and 108 of the first embodiment. Once assembled, the second embodiment provides a substantially similar cage system 100 to the first embodiment (see FIG. 12).

To assemble the second embodiment of the cage system 100, the flat sheet (as best shown in FIG. 10) is folded along fold lines 120 to form the back, left, and right sides 106, 110, and 112, respectively, of the cage assembly 100 (see FIG. 11). The bottom side 104 is then attached to the flange portions 156, 124, and 126 with one or more mechanical fasteners 128 (see FIGS. 11 and 12) and/or adhesive. The top and front sides are then attached as described above for the first embodiment.

The rail assemblies 130 and 132, and the frames 134, 140*t*, and 140*b* are preferably made from linear profile sections 152 connected at the corners by joints 154. The profile sections 152 may be made of aluminum or plastic, preferably extruded aluminum; and the joints may be made of injection molded plastic. The profile sections 152 and joints 154 may be formed by extrusion, molding, or other methods known in the art. The one or more openings 164 in the frame 134 of the top side 102 may be formed on the profile sections 152, as shown in FIG. 5, or the joints 154, as shown in FIG. 12. Because the profiles 152 are extruded aluminum, they provide structural strength, are lightweight, and occupy relatively little space when shipped in a carton.

Figure 17:
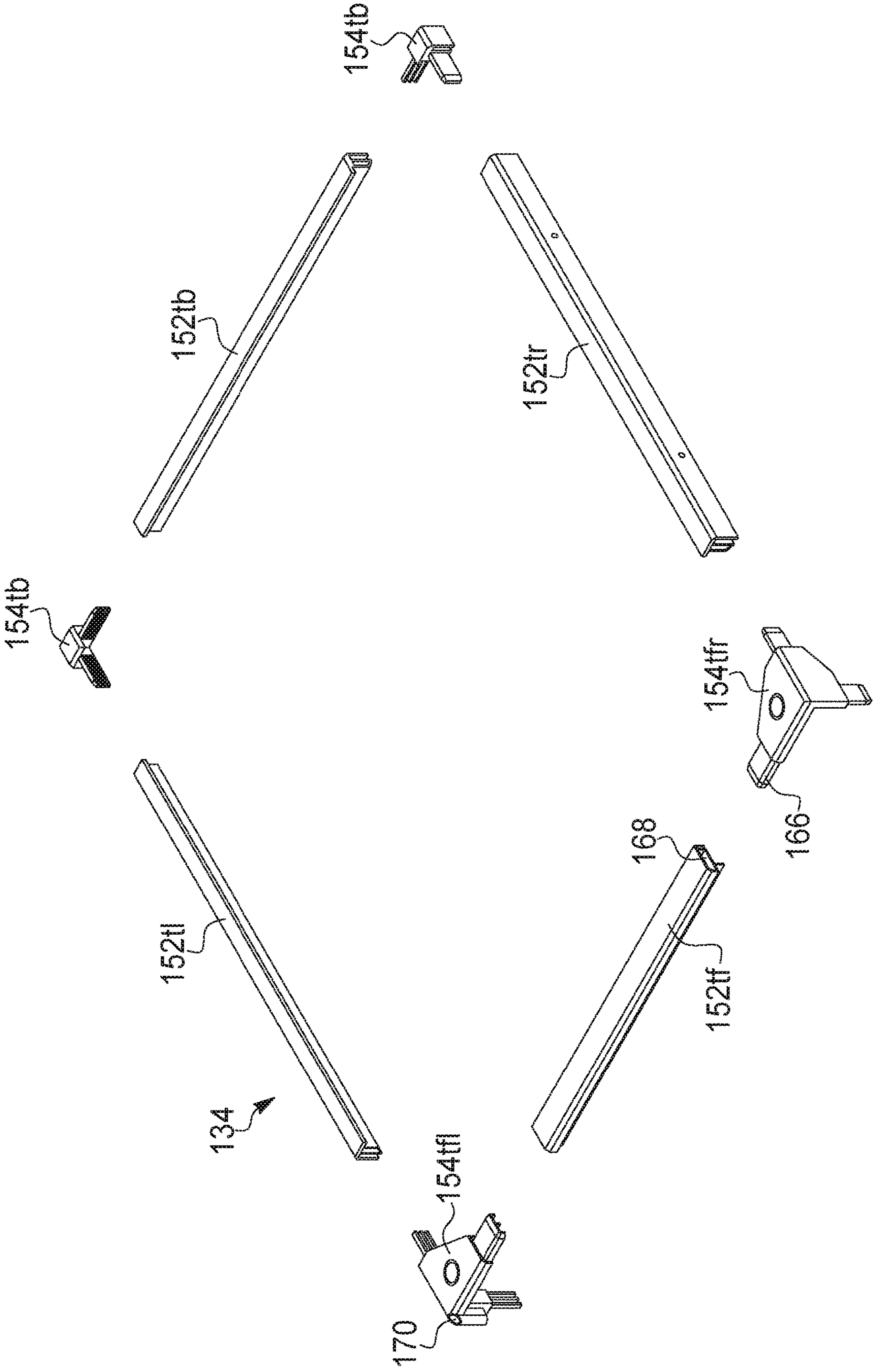
FIG. 17 shows an exploded view of an exemplary perimeter frame for the top side.
Figure 18:
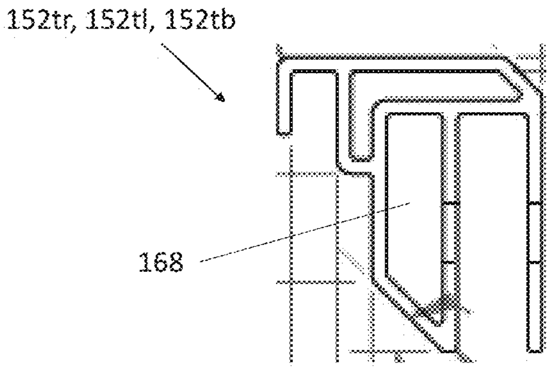
FIGS. 18 and 19 show sectional view of the profile sections of the frame for the top side.
Figure 19:
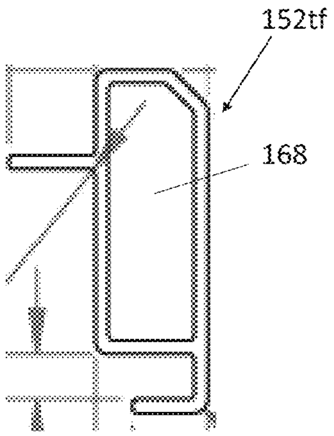
Figure 20:
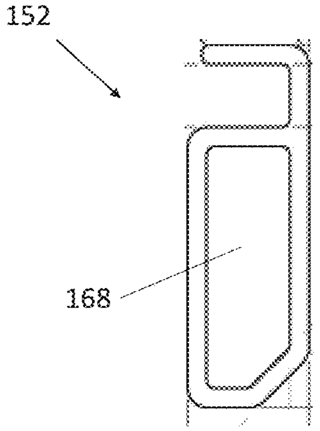
FIGS. 20-21 show sectional views of the profile sections for the frames for the top and bottom portions.
Figure 21:
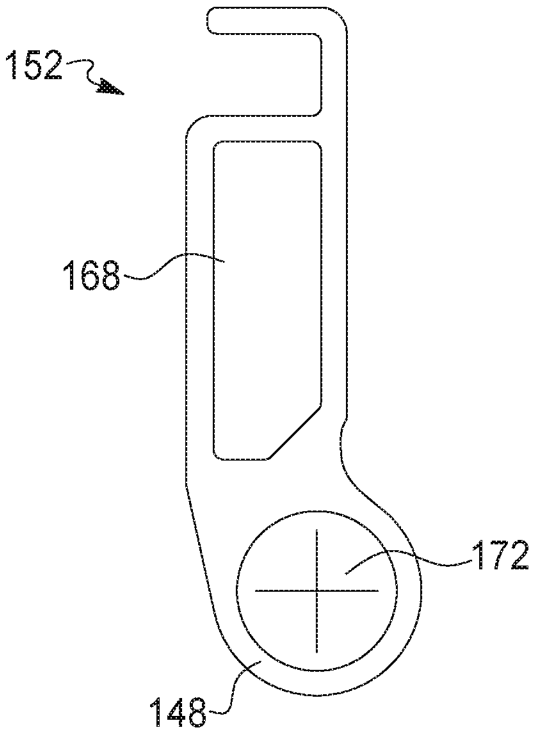
Figure 22:
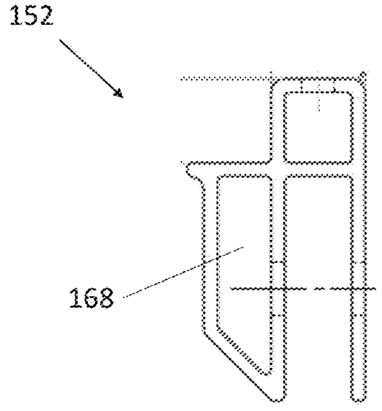
FIGS. 22-23 show sectional views of the profile sections for the right and left rail assemblies.
Figure 23:
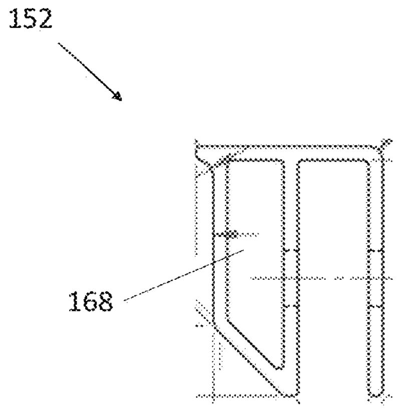

FIG. 17 shows an exemplary perimeter frame 134 for the top side 104. The frame 134 includes two front corner joints 154*tfl* and 154 *tfr* and two back corner joints 154*tb*. The joints 154*tfl*, 154*t*1*r*, and 154*tb* includes one or more press-fit inserts 166 that are configured to fit into openings 168 of profile sections 152. The back corner joints 154*tb* are mirror images of each other, while the front corner joints 154*tfl* and 154*tfr* differs from each other. The front corner joint 154*tfl* includes a hole 170 for accommodating the hinge pin 150 or 160 forming the hinge position 148. As shown in FIG. 17, the frame 134 includes four profile sections, 152*tf*, 152*tr*, 152*t*1, and 152*tb*. The cross-section of the profile sections may be different from each other and depends on the shape of the insert(s) 166 to which the profile section mate. For example, as shown in FIG. 17, the cross-section for profile sections 152*tr*, 152*t*1, and 152*tb* are identical (see FIG. 18), but different from the cross-section for the profile section 152*tf* (see FIG. 19), due to the different functional and connection requirements of the individual profile section. FIG. 18 shows an exemplary cross-section for profile sections 152*tr*, 152*t*1, and 152*tb*; and FIG. 19 shows an exemplary cross-section for profile section 152*tf*. Other joints 154 and profile sections 152 may be utilized based on their respective functional and connection requirements. For example, FIGS. 20-21 show the cross-section of the profile sections 152 for the frames 140*t* and 140*b*. The profile shown in FIG. 21 forms the hinge side of the frame 140*t* or 140*b* where the hole 172 accommodates the hinge pin 150 or 160. FIGS. 22-23 show the cross-sections of the right and left rail assemblies 130 and 132, respectively.

Figure 13:
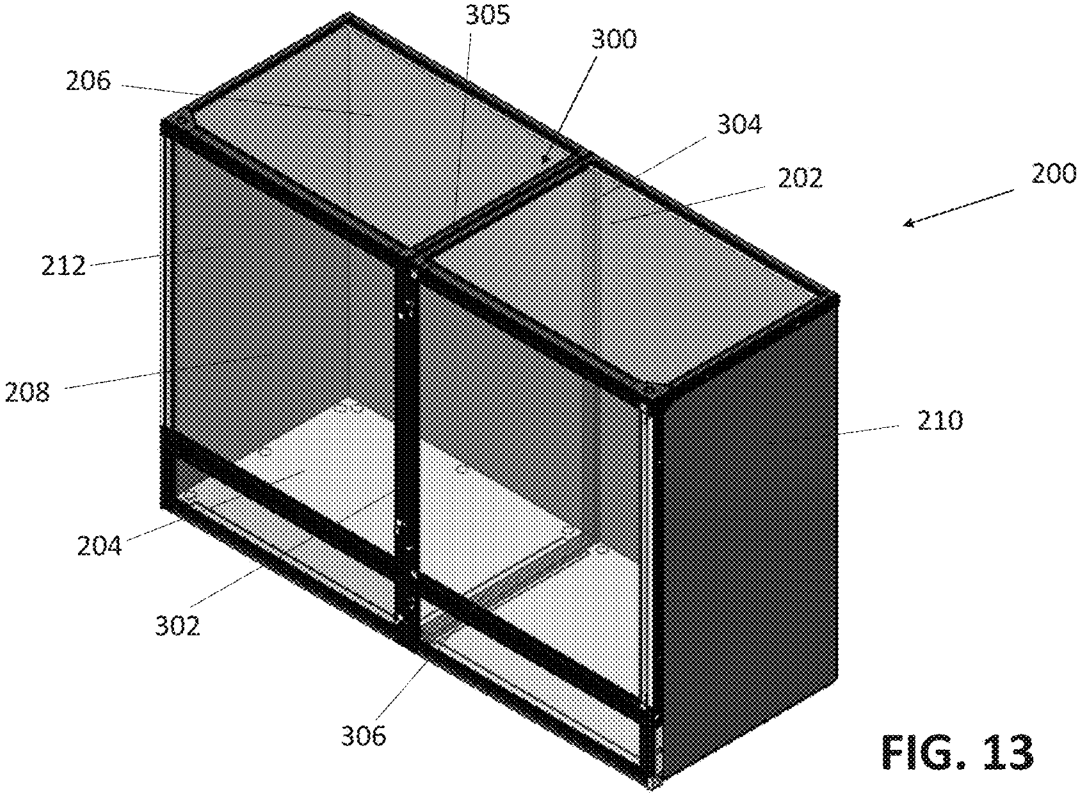
FIG. 13 is a perspective view of a double cage embodiment.

FIGS. 13-16 show a third embodiment of the present invention, referred to herein as the double cage system 200. As best shown in FIG. 13, the double cage system 200 is similar to the other embodiments in that it provides a six-sided a rectangular box containing: a top side 202, a bottom side 204, a back side 206, a front side 208, a right side 210, and a left side 212. The back side 206, right side 210, and left side 212 are solid sides, preferably made from corrugated plastic sheet material of about 4 mm in thickness. The double cage system 200, however, is larger than the other embodiments and additional structural support is provided to maintain structural integrity of the assembled structure. The double cage system 200 contains similar structures as disclosed for the first and second embodiments. Where similar structures exist, the numerical references for similar structures have the same last two digits, with the reference numerals for the double cage system 200 having 2 as the first digit, while the reference numerals for the first and second embodiments includes 1 as the first digit. For example, the left and right sides 212 and 210 of the double cage system 200 corresponds to the left and right sides 112 and 110 of the first and second embodiments. Additional structures including in the double cage system 200 (which have no corresponding structures in the first and second embodiments) are referred to with numerals having 3 as the first digit.

In addition to the structures similar to those disclosed above for the first and second embodiments, the double cage system 200 includes a center support assembly 300, dividing the cage 200 into left and right portions (see FIG. 13). The center support assembly 300 includes extruded aluminum profile sections providing a front support 302, a back support 304, a top support 305, and a bottom support 306. The front and back supports 302 and 304, respectively, are preferably parallel to each other; and the top and bottom supports 305 and 306 are preferably parallel to each other. The bottom support 306 connects the bottom ends of the front and back supports 302 and 304; and the top support 305 connects the top ends of the front and back supports 302 and 304. The center support assembly 300 may be formed, as described above for the frames 140*t*, 140*b*, and 134, with linear profile sections 252 connected at the corners by injection molded plastic joints 254 (see, e.g., FIG. 14).

The back support 304 provides support for the back side 206, and is preferably aligned vertically at the center of the back side 206, extending from the topside 202 to the bottom side 204. The back support 304 may be attached to the back side 206 with one or more mechanical fasteners and/or adhesive.

The bottom support 306 provides support for the bottom side 204, extending from the back side 206 to the front side 208. Like the back support 302, the bottom support 306 may be attached to the bottom side 204 with one or more mechanical fasteners and/or adhesive.

The top support 305 provides support for the top side 202, extending from the back side 206 to the front side 208. Like the bottom support 306, the top support 305 may be attached to the bottom side 204 with one or more mechanical fasteners and/or adhesive.

Figure 16:
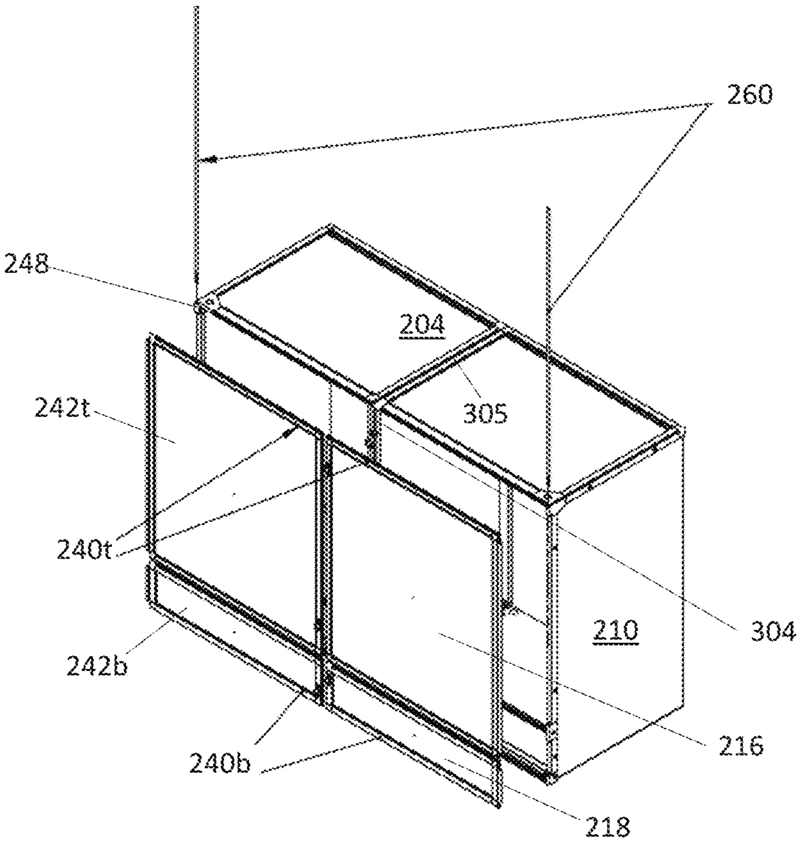
FIG. 16 is an exploded view of the partially assembled cage and the front doors of the double cage embodiment.

The front support 302 provides support for the front side 208, and is preferably aligned vertically at the center of the front side 208, extending from the topside 202 to the bottom side 204. The front support 302 divides the front side 208 into a left half and a right half. Each of the left and right halves has a top portion 216 and a bottom portion 218 that are similar to and have the same general construction as the top and bottom portions 116 and 118 of the first and second embodiments (see FIGS. 13 and 16). As best shown in FIG. 16, the top portion 216 includes a perimeter frame 240*t* and either a mesh screen or clear material, such as glass or plastic, filling the open area 242*t* inside the frame 240*t*. The bottom portion 218 includes a perimeter frame 240*b* and either a mesh screen or a clear material, such as glass or plastic, filling the open area 242*b* inside the associated the frame 240*b*. The top and bottom portions 216 and 218, respectively, form doors that pivot on their hinges. On the left half, the top and bottom portions 216 and 218 are hingedly attached to the rail assembly 232 on the left side 212; on the right half, the top and bottom portions 216 and 218 are hingedly attached to the rail assembly 230 on the right side 210. The doors 216 and 218 may open and close by pivoting on hinges on the rail assemblies 232 and 230. Closure of the doors occurs by latching them to the front support 302.

Figure 15:
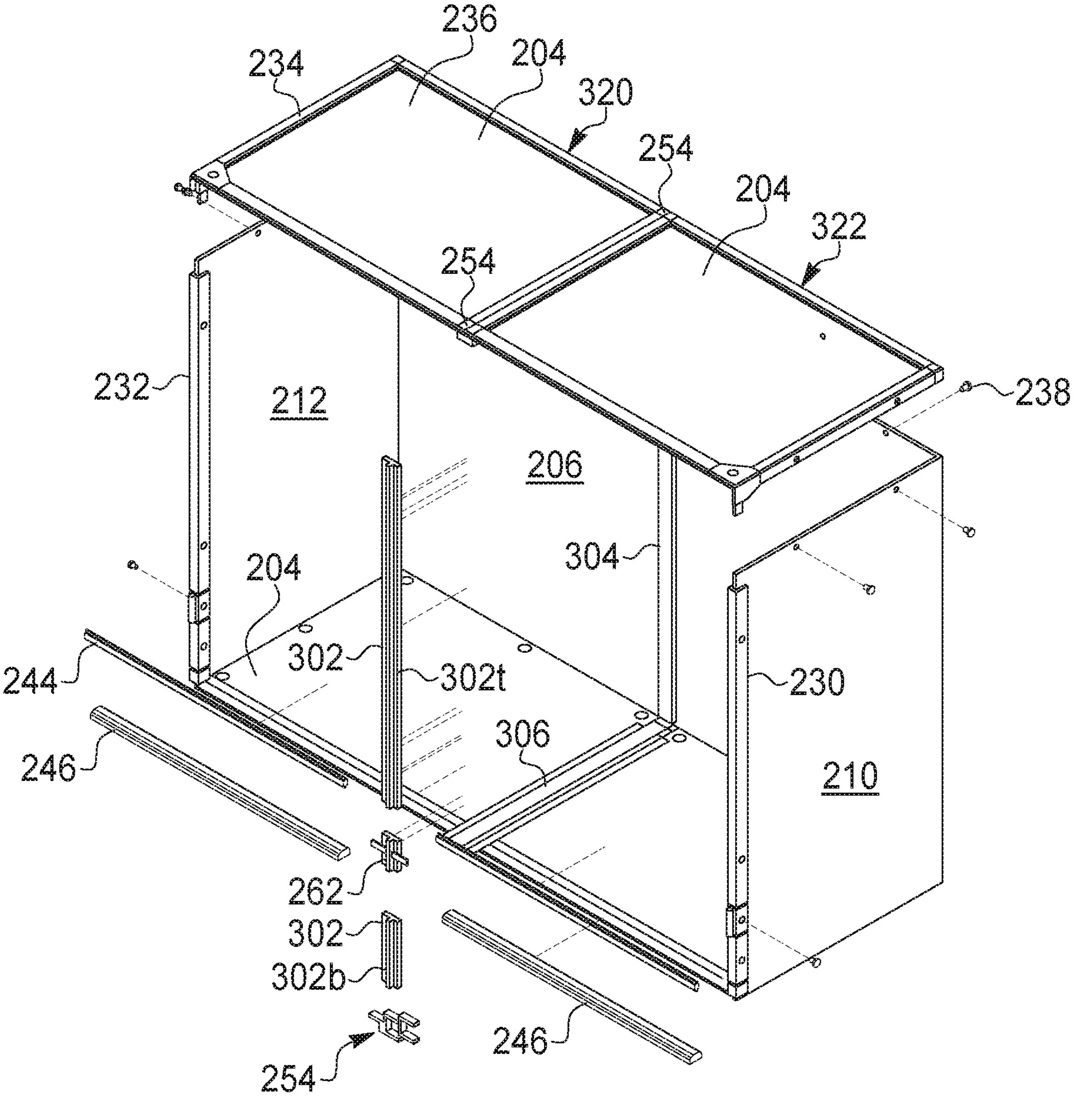
FIG. 15 is an exploded view of the assembled corrugated plastic part, the top side, the support assembly, and the divider and lower profiles of the double cage embodiment.

The front support 302 also includes a press-fit mating part 262 for attachment of divider profiles 244 thereto (see FIG. 15). Each of the left and right halves include a divider profile 244 attached to the rail assembly 230 or 232 and the front support 302 to divide each of the left and right halves into top and bottom sections. The top section accommodates the top portion 216 and the bottom section accommodates the bottom portion 218 (see FIG. 16).

Figure 14:
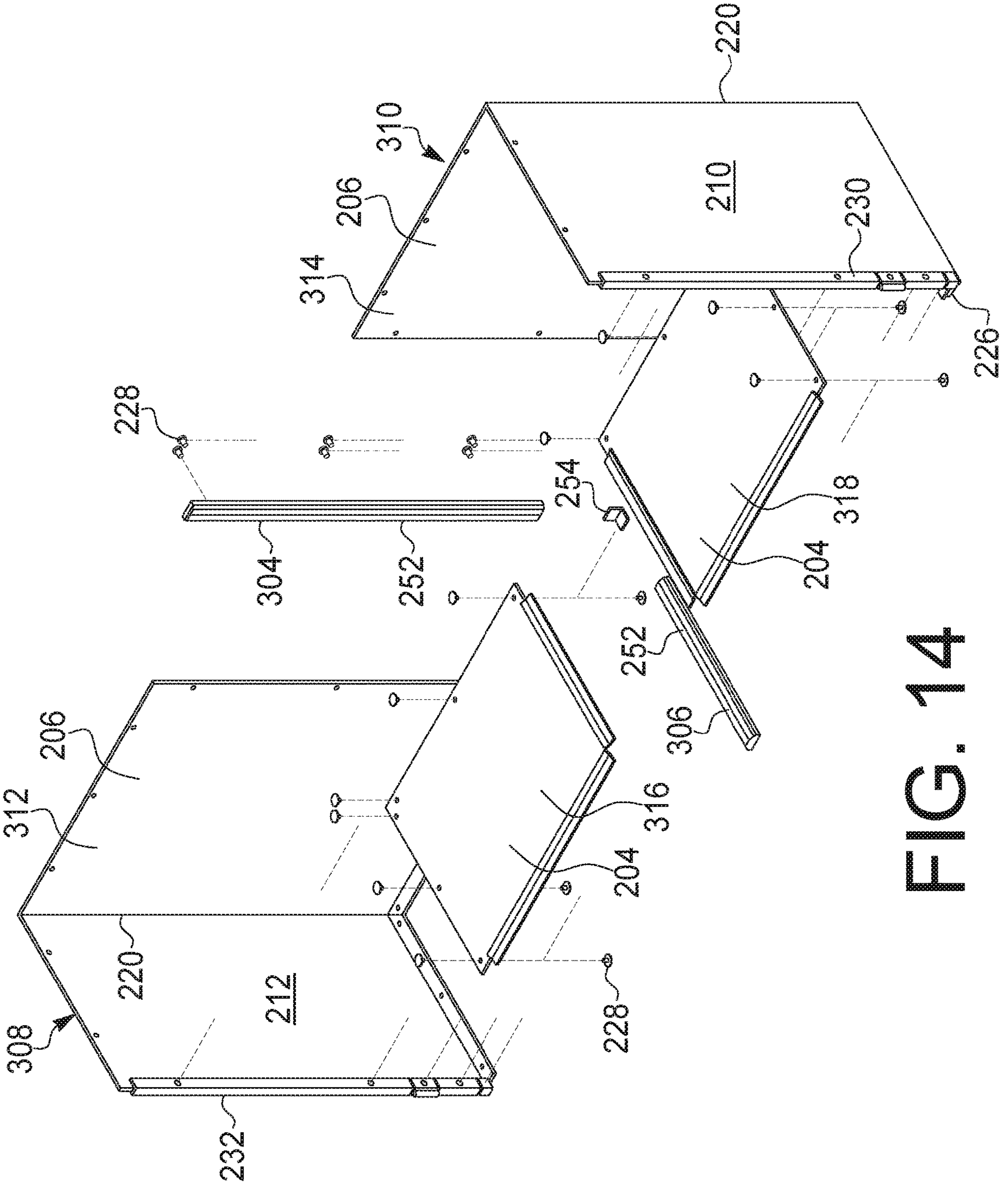
FIG. 14 is an exploded view of the assembled corrugated plastic parts of the double cage embodiment.

The back, right, and left sides 206, 210, and 212, respectively, are made from two sheets of corrugated plastic sheet material (Coroplast), as shown in FIG. 14, which is die cut, and contains pre-formed fold lines 220. A left sheet 308 forms the left side 212 and a left part 312 of the back side 206; and a right sheet 310 forms the right side 210 and a right part 314 of the back side 206. The two sheets 308 and 310 are joined by the back support 304, preferably with one or more mechanical fasteners 228 (see FIG. 14). Because the bottom sides 204 are not included in the flat sheets, the left, back, and right sides 212, 206, and 210, respectively, may include flange portions 224, 256, and 226 at their bottom edges for attachment of the bottom side 204. As described above, the right and left sides 210 and 212 also include vertical rail assemblies 230 and 232, respectively. Once folded, the back support 304 completes the back side 206 by joining the left and right parts 312 and 314 of the back side 206.

The bottom side 204 may be attached, in a single piece, as described above for the first and second embodiments. Alternatively, as best shown in FIG. 14, the bottom side 204 preferably includes two parts: a left part 316 and a right part 318. The left and right parts 316 and 318 of the bottom side 204 are joined by the bottom support 306. Preferably, the left and right parts 316 and 318 slide into channels in the bottom support 306 and are retained therein by friction. Alternatively, the left and right parts 316 and 318 may be attached to opposing sides of the bottom support 306 by one or more mechanical fasteners and/or adhesive. The bottom side 204 is secured in place by attachment to the flanges 224, 256, and 226 of the left side 212, back side 206, and right side 210, respectively, preferably by mechanical fasteners 228 and/or adhesive. Each of the left and right parts 316 and 318 of the bottom side 204 includes a lower profile 246 (see FIG. 15) at its front edge to prevent the lowest hem joint from bowing and to preserve structural integrity of the cage system 200. The lower profile 246 is held in place in a similar manner as that of the lower profile 146 described above for the first and second embodiments.

The top side 202 may be attached, in a single piece, as described above for the first and second embodiments. Alternatively, as shown in FIG. 15, the bottom side 204 preferably includes two parts: a left part 320 and a right part 322. Each of the left and right parts 320 and 322 includes a perimeter frame 234 and a mesh screen or plastic material filling the open area 236 inside the frame 234. The left and right parts 320 and 322 are joined at one side of their respective perimeter frame 234, by mechanical fasteners and/or adhesive. The joined topside 202 is then attached to the left, back, and right sides 212, 206, and 210, preferably by mechanical fasteners 238 and/or adhesive. The joined seem between the left and right parts 320 and 322 of the top side 202 forms the top support 305 which is connected to the back support by a joint 254.

As best shown in FIGS. 13 and 15, the front support 302 divides the front side 208 into a left half and a right half and includes two linear profiles, a top profile 302*t* and a bottom profile 202*b*, connected by the mating part 262. The mating part 262, as described above, also provides connections for the divider profiles 244. The top end and bottom ends of the front support 302 are attached to the top support 305 and the bottom support 306, respectively, by joints 254.

As shown in FIG. 16, doors for the top and bottom portions 216 and 218 are hung on the left and right assemblies 232 and 230 as described above. Preferably, a single metal hinge pin 260 traverses all three hinge positions 248 to hingedly attach the doors 216 and 218 to the rail assembly 132 (see FIG. 16).

Once assembled, the cage system 100, 200 is a six-sided cage featuring a screened top and a screened front door(s) for ventilation. These screened doors and top may easily be replaced with any combination of screen or solid plastic or glass material as the intended use requires for maintaining proper environment within the cage system 100, 200.

As a result of the use of corrugated plastic, the present animal cage systems 100, 200 are significantly lighter than glass cages, but retain moisture within the interior environment. They also do not crack as may occur with a glass cage. The cages 100, 200 may be modified to incorporate additional ventilation or mounting holes by cutting or drilling the plastic sheet as the user sees fit.

Another benefit of the corrugated plastic sheet is that it can be digitally printed upon. Therefore, the cage system 100, 200 can be made available with pre-printed forest, jungle, desert, or any other type of scene that is desired, pre-printed onto the inside of the cage. This has the advantage of calming the inhabitant of the cage with a natural look, and making decorating the cage easier for the owner. Corrugated plastic is also easy to disinfect, has a high melting temp, and is very robust.

Figure 7:
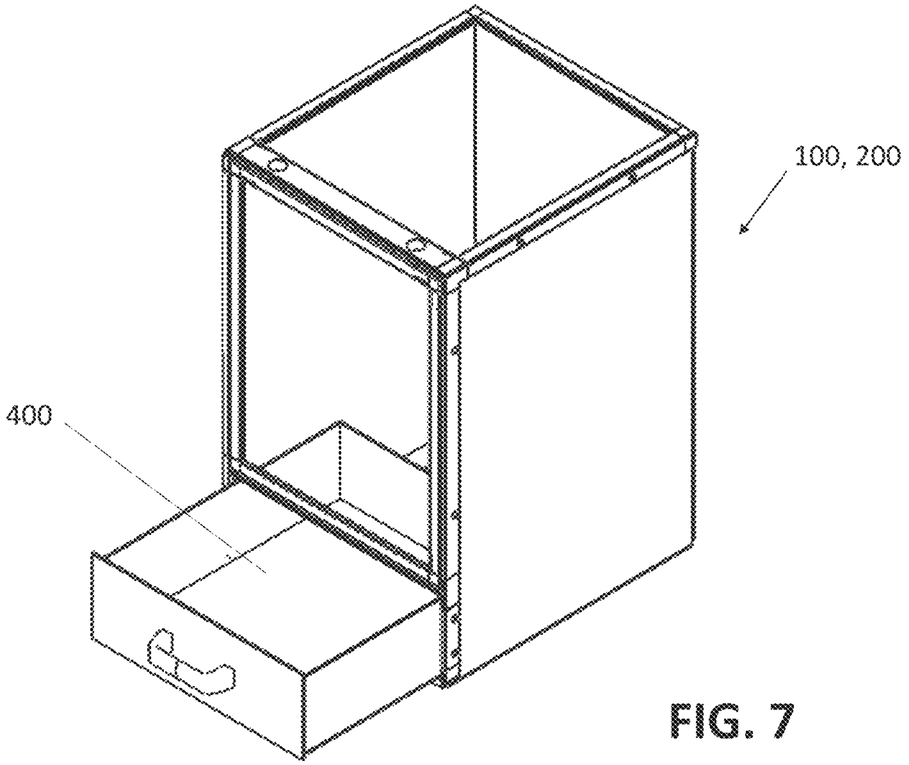
FIG. 7 is a perspective view of an alternate embodiment of the assembled animal cage system.

In certain embodiments, in place of the lower door in the bottom portion 118 of the front side 108, a sealed five-sided tray 400 may be present (see FIG. 7). The tray 400 is configured to contain water, food, soil, or other substrate for the animal, without allowing such water, food, soil, or other substrates to escape from the cage system 100, 200. The tray 400 is also configured for slidable insertion into and removal from the bottom of the of the cage system 100, 200 to allow for periodic cleaning, and/or replacement of water, food, soil, or other substrates. The tray 400 may be made from corrugated plastic (folded from a single sheet or assembled from individual panes of sheet) or thermoformed materials. When used with the double cage system 200, each half of the cage system 200 includes a tray 400, so that the cage system 200 includes two trays in its front side 208.

Figure 8:
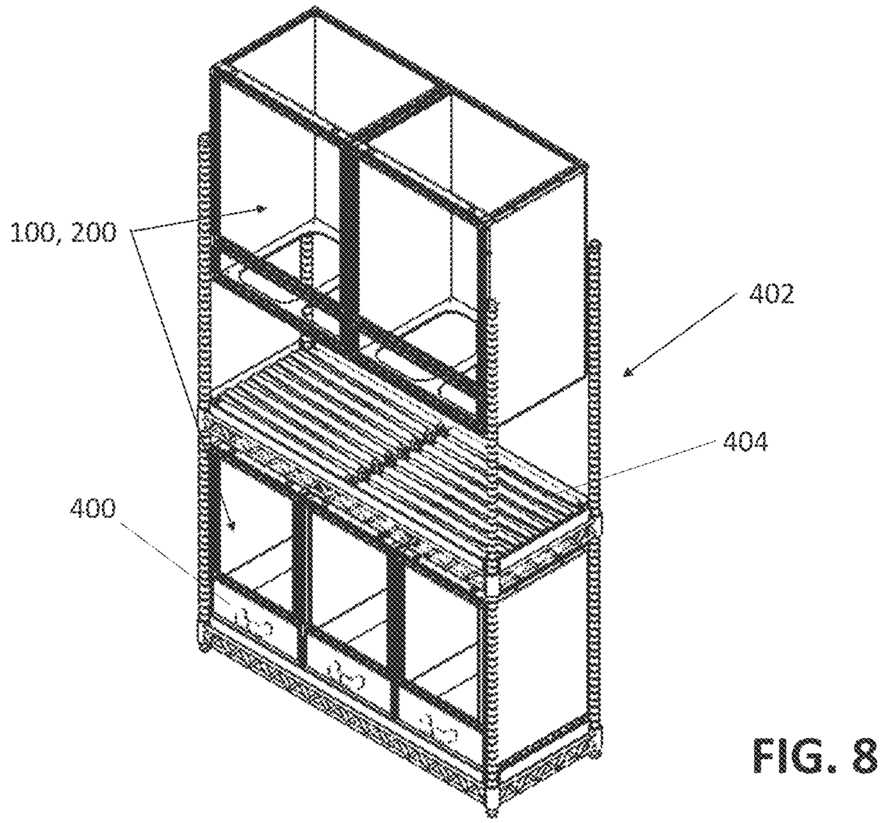
FIG. 8 shows a rack system containing a plurality of stacked cage systems.
Figure 9:
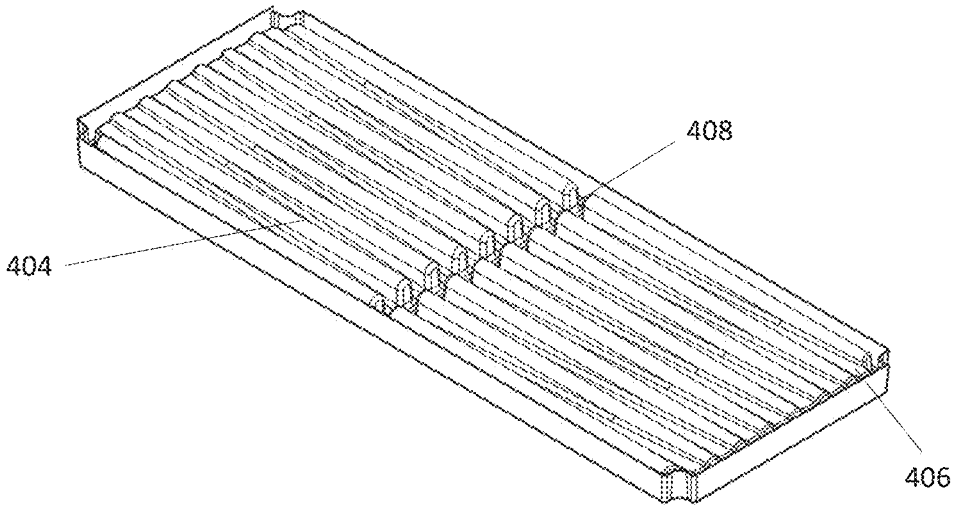
FIG. 9 is a perspective view of an external catch tray.

As illustrated in FIG. 8, a plurality of cage systems 100, 200 may be stacked onto a rack system 402. FIG. 8 shows the top cage systems 100, 200 lifted to expose one or more external catch trays 404 located directly below the cage systems 100, 200. In use, the cage system(s) 100, 200 are lowered directly on top of and in contact with the catch tray 404. The catch tray 404 may be used with cage systems 100, 200 having an opened bottom side 104, 204 for catching water, food, soil, or other substrates for the animal. The catch tray 404 may be configured to fit a single or multiple cages 100, 200, respectively, within a rack system 402. The rack system 402 preferably is formed by interconnected metal sections extending horizontally and vertically, resembling metal shelving, in order to accommodate and seat the cages, 100, 200. Preferably, the catch tray 404 is optimized to fit within standardized rack systems, allowing multiple cages 100, 200 to be nested together to save space. Preferably, the catch tray 404 contains sloped surfaces 406 (see FIG. 9) to channel water to a point where a drain hole and/or valve (not shown) is installed for drainage. For example, as shown in FIG. 9, the surfaces 406 are sloped toward the center of the catch tray 404, so that water is directed to a center drainage channel 408 which contains a drainage hole and/or valve (not shown). The catch tray 404 may be made from folded corrugated plastic (from individual panes of sheet) or thermoformed materials, with the thermoformed materials being preferred.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A cage system for small reptiles, comprising:
a top side;
a bottom side opposing the top side;
a front side connecting the top and bottom sides;
a back side opposing the front side;
a right side connecting the front and back sides;
a left side opposing the right side, and
at least one of adhesive and mechanical fasteners connecting the bottom side with the back, left and right sides;
wherein the top, bottom, front, back, right, and left sides enclose a rectangular box having a single compartment,
wherein the back, left, and right sides are made of a single solid unitary sheet of material having pre-formed fold lines separating the sides,
wherein the top and front sides are made of pieces of material separate from the single solid unitary sheet of material,
wherein each of the right and left sides includes a folded flange portion defined by one of the pre-formed fold lines,
wherein the flange portion of each of the right and left sides connects the associated side to the bottom side,
wherein the flange portions of the right and left sides are attached to the bottom side with the at least one of adhesive and mechanical fasteners,
wherein the top side is attached to the single solid unitary sheet of material with at least one of adhesive and mechanical fasteners,
wherein the front side is divided into a top portion and a bottom portion,
wherein at least the top portion includes a first door hingedly connected to one of the left and right sides and securable to another of the left and right sides, and
wherein the bottom portion includes a second door or a tray.

2. The cage system of claim 1, wherein the single solid sheet of material is corrugated plastic.

3. The cage system of claim 1, wherein the bottom is made from a single solid sheet of material.

4. The cage system of claim 1, wherein the top side includes a perimeter frame and a mesh screen or clear plastic material filling an area inside the frame.

5. The cage system of claim 4, wherein a plurality of boxes are interconnected in vertical or horizontal relation.

6. The cage system of claim 4, wherein the frame is made of linearly extending aluminum profile sections connected at corners by molded plastic joints.

7. The cage system of claim 1, wherein a catch assembly is slidably disposed along the bottom side to allow waste to be removed from the box.

8. The cage system of claim 1, wherein the back side includes a flange portion folded along one of the preformed fold lines and connected to the bottom side, and wherein the bottom side is attached to the flange portion of the back side with adhesive and/or mechanical fasteners.

9. The cage system of claim 1, wherein the first door comprises a perimeter frame and a mesh screen or clear plastic material filling an area inside the frame.

10. The cage system of claim 9, wherein the first door is hingedly mounted to a rail assembly on the left or right side.

11. The cage system of claim 9, wherein the perimeter frame is made of linearly extending aluminum profile sections connected at corners by molded joints.

12. The cage system of claim 1, wherein a front edge of the bottom side comprises a lower profile attached thereto.

13. The cage system of claim 1, wherein a divider profile attaches to rail assemblies on the front edges of the left and right sides.

14. The cage system of claim 1, wherein a bottom portion comprises a second door or a tray.

15. The cage system of claim 1, further comprising a center support assembly positioned to divide the rectangular box into left and right portions.

16. The cage system of claim 15, wherein the center support assembly comprises a front support, a back support parallel to the front support, a bottom support connecting bottom ends of the front and back support, and a top support connecting top ends of the front and back support, wherein the back support is aligned vertically at a center of the back side and extends from the top side to the bottom side, the bottom support extends from the back side to the front side, and the front support is aligned vertically at a center of the front side and extends from the top side to the bottom side.

17. The cage system of claim 16, wherein the front support divides the front side into a left half and a right half, the first door is located on the left half and a second door is located on the right half.

18. The cage system of claim 17, wherein the first door is hingedly mounted to a first rail assembly on the left side, and the second door is hingedly mounted to a second rail assembly on the right side.

* * * * *